Nov. 5, 1946.　　　D. K. WARNER　　　2,410,471
INTERNAL-COMBUSTION ENGINE
Filed May 28, 1940　　　2 Sheets-Sheet 1

Inventor
Douglas K. Warner

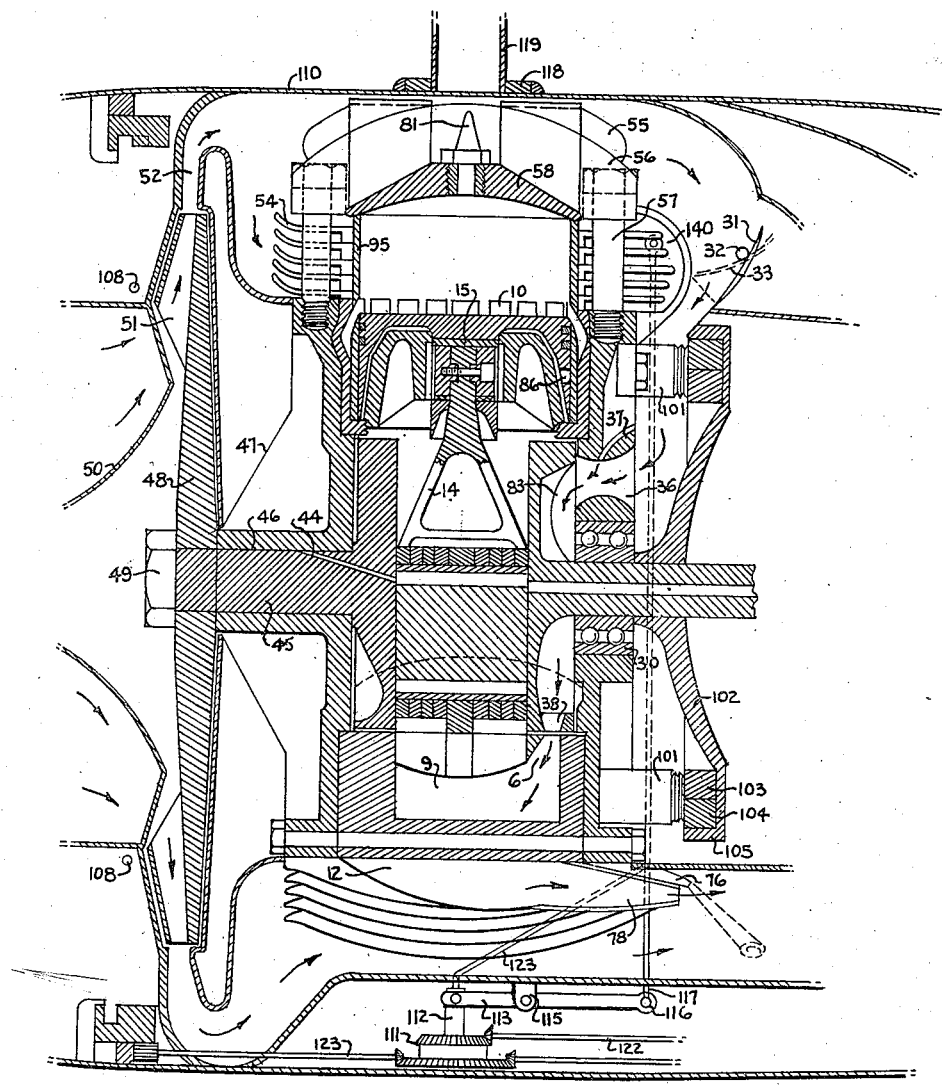

Patented Nov. 5, 1946

2,410,471

UNITED STATES PATENT OFFICE 2,410,471

INTERNAL-COMBUSTION ENGINE

Douglas K. Warner, Sarasota, Fla.

Application May 28, 1940, Serial No. 337,688

8 Claims. (Cl. 123—55)

This invention relates to internal combustion engines of the two-cycle type, and has for its object to provide such an engine which will develop an incredibly high horse-power per pound of engine, in an extremely small size, a midget with giant's strength; in which by various novel features the cylinders may be closely grouped and all the contributing parts affiliated with them and with one another, in intimate relations both as to nearness of parts, and nearness of interrelated action each upon or to the other, with consequent elimination of waste of energy, and with concomitant extreme increase of efficiency of the engine; a further especial object being to accomplish scavenge of the cylinders in a manner which will not only increase the speed and power of the engine, but also enable its being built with still less size and weight.

My invention consists primarily of a two-cycle radial engine comprising a number of cylinders having pistons which on the down-stroke discharge compressed carbureted air from beneath said pistons through a short tapered edge directly into the explosion chamber of the next adjacent cylinder to charge and scavenge the same in a most efficient manner, i. e., with such velocity and pressure and in such directions as to occupy the said explosion chamber without harmful admixture of unscavenged exhaust therewith; accomplishing this without the need of piston-baffles, thus lowering the cylinder head and reducing the piston-weight very materially; secondly, it comprises a structure of novel devisement in which the pistons descend upon aprons in compressing said carbureted air and ejecting it into the adjacent cylinder, and in which the connecting-rods are so designed and positioned that the piston-rods occupy a minimum of the cylinder-volume below the pistons, effecting the compression and complete ejection of the said carbureted air through the short tapered passages necessary for accomplishing the purpose of the invention; thirdly, it consists in so arranging the cylinders, the pistons, the inlet and exhaust ports, that at certain fixed degrees of revolution of the crank-shaft the various actions of the parts will be so adjusted as to produce the right sequence of motions thereof to effect an arranged degree of compression, and later decrease of compression, coordinated with the opening and closing of inlet and exhaust ports; fourthly, in a particular sort and arrangement of inlet and outlet ports at the centre of the cylinder, acting in conjunction with allied elements of the engine to effect novel and complete scavenge of the cylinder; fifthly, in a newly devised blower for the carbureted air to the under chamber below the pistons, with means for directing the inflow and cut-off of gas by the blower-disk; and lastly in a combination of other auxiliary features coordinated with these main elements of the invention to produce the desideratum of a mighty mite of an engine, developing more power per engine-pound than anything comparable.

In the accompanying drawings forming part of this specification, in which like reference numerals indicate like parts in all the figures, and arrows indicate the directions of air or gas flow:

Figure 3 is a side central section of the motor, or engine, compressor, magneto.

These drawings illustrate my invention in the embodiment of a five-cylindered engine. I do not restrict myself to five cylinders, and much of my invention is applicable to engines quite other than this, but in the form of a five-cylindered engine, I achieve certain singular attributes and certain efficiency which comparatively are not producible in any other form, except by modifications not necessary to go into here.

Figure 1:
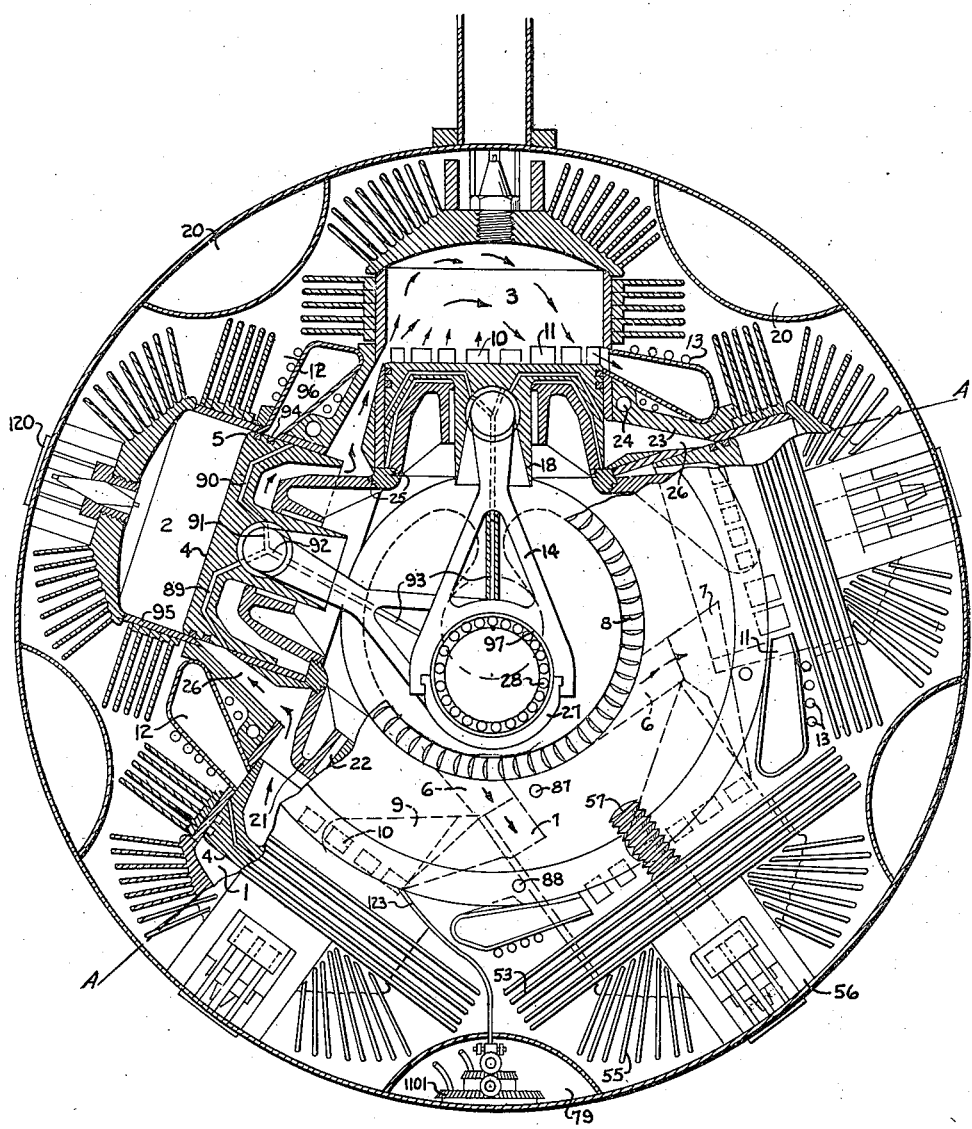
Figure 1 is a half front view in full scale of the motor or engine, and half front view with the blower and housing removed.
Figure 2:
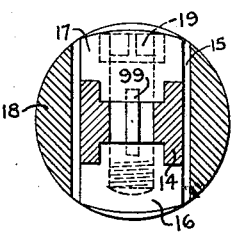
Figure 2 is a cross-sectional view of the wrist-pin bearing and piston-rod.

The cylinders 1, 2, 3, respectively, the other two shown in dotted lines, are set radially at equal distances apart, namely, 72 degrees from centres. In each cylinder is mounted a piston 4, formed with a rounded upper edge 5, and flanged downwardly on its under periphery. The piston is cast integrally with its piston-rod 18 which has within it a cast-in bearing-sleeve or bushing 15, which bushing is slotted open at its lower side to admit the connecting-rod 14. The connecting-rods are of generally box-framed construction, Y-shaped downwardly, terminating in annular ends 27, surrounding roller-bearings 28, and the crank-shaft 83. They are pivoted inside the tubular interior of the piston-rod 18, which is flared outwardly and downwardly, and provided with wrist-pin 16, which at one end is tapped to receive a bolt 19 which also passes through the upper end of the connecting-rod, the opposite end 17 of the wrist-pin being drilled to permit entrance of said bolt, and recessed to receive the bolt-head, which is interiorly squared or hexed to be turned by an appropriate screw-driver, inserted through hole 86 in the piston, as indicated in Figure 3 and said wrist-pin, said bolt, and said connecting-rod are all secured by a key 99 slotted in the wrist-pin ends and in the said upper end of the connecting-rod. All of the five connecting-rods 14 are mounted on the crank-shaft as shown in Figure 1 as to the individual mounting, and in Figure 3 as to the collective arrangement.

The pistons 18, which are substantially cup-shaped, as shown, descend upon annular, similarly cup-shaped or frusto-conical aprons 21, which rest on the base of the cylinder, and through the centre of which aprons the piston-rods extend, these passing through suitable bronze or other bearings 22, which act as a cross-head guide and stuffing-box for the piston-rod 18 which slides within it. The aprons are seated in rings 25.

Each of the cylinders is provided with a number of inlet-ports 10 and exhaust-ports 11. The inlet-ports 10 occupy about 60% of the circumferential wall of the cylinder, the exhaust-ports 11 the remainder. The exhaust-ports 11 extend somewhat higher up than the inlet-ports.

The height of the explosion chamber of the cylinder above these ports and above the piston-head is remarkably low; a condition of material advantage due to the novel scavenge and charge arrangements of my invention and to the fact that thereby no baffle-plates are necessary upon the piston.

The cylinder carries horizontal and radially vertical fins 54 and 55, and spark-plug. After the pistons and connecting rods and aprons are in place, the cylinder-head 58 is clamped down by bolts 57 through the yoke 56. The fins 55 are on the head.

Each piston is provided with the usual rings 94 and 96. The displacement area of the piston in its lower pressure chamber beneath the piston and above the apron 21, is within 15% of its displacement area in the upper explosion chamber, the said 15% reduction being due, of course, to the area of the piston-rod 18. There is thus, to begin with, 85% displacement area of said piston in the pressure chamber beneath it, in addition to which my structure as hereinafter described, provides a more than compensating augmentation of pressure upon the carbureted air which is first introduced into this lower chamber before it passes on to the next adjacent one and is then most efficiently injected therein.

A blower-fan 3 is mounted upon the crank-shaft 33 and is furnished with blades 51 on about one-half of its circumference, the remainder of the disk being formed into a counter-weight portion of the fan-disk. An air-inlet 36 admits air to the blower-fan and gas-inlet 37 admits gasoline thereto. Inlet 36 is a Venturi tube, which increases velocity of the air to assist in sucking in gasoline with it. The carbureted air is blown through ports or passages 6 and 7 up into the lower pressure chambers of the cylinders, for approximately half the revolution of the fan, and then the counterweight half of the fan-disk shuts off the ports or passages 6. This action of the fan is coordinated with the stroke of the pistons, as hereinafter explained.

From each of these lower pressure chambers short tapered passages 26 extend to and communicate with the air-inlet ports 10 of the next adjacent cylinder, to transmit the carbureted and compressed air or gas into the upper explosion chamber of said cylinder. These passages 26 are wide at their rear ends which receive the compressed gas from the pressure chamber and narrow down sharply to their outlet ends which connect with the inlet-ports 10. The said passages surround the cylinder for about 60% of its circumference, to match the inlet-ports 10, and they have a varied angle of connection with or direction to, said inlets 10, whereby the compressed gas will be injected into the explosion chamber with different degrees of angle from each inlet-port, ranging from about 68° from the inlet-ports furthest from the exhaust-ports 11, to a lesser angle from the inlet-ports nearest the exhaust-ports. The inlet ports 10, which are the openings and exits of the passages 26 into the cylinder, and hence the entrance ports for the combined compressed scavenge and explosion charge of the carbureted gas into the cylinder, thus, by reason of the said varied angles of the narrowed ends of the passages 26 at these points, inject the stream of charge into the cylinder not in one straight line, which would result in only partial scavenge, and in a swirling motion of the charge impairing grossly the efficiency and completeness of quick scavenge, but in a plurality of lines, which range from the entrance angle of 68 degrees upward from the inlet ports furthest from the exhaust ports, in varying degrees toward the said exhaust ports, with the inlet port 10 nearest said exhaust ports having the entrance angle of say 50 degrees upward. While these angles are determined by the interior formation of the inlet ends of the passages, the varying angles and inlet jets resulting are clearly shown by the arrows above said inlet ports 10 in Figure 1 of the drawings.

These passages 26, located with the wide end at the pressure chamber of one cylinder and the narrowed ejector end at the inlet-ports of the next adjacent cylinder, constitute an immediate and direct connection from one cylinder to the next. They are such an important factor in the efficiency and speed of my engine, that it is highly necessary that they be not only made smooth, with all roughness eliminated in the fashioning, but that they also be highly polished, which is not always, if ever, possible with passages between cylinders for air or gases. This is however, effected in my invention, by forming these passages partly of the wall of the crank-case 23 and partly of the wall of the cylinder with which they connect to charge the same, as shown in Figure 1. Both of these surfaces are thoroughly polished before the engine is assembled and when put together tightly, they form a finely machined and highly polished interior of the passages. By constructing these passages 26, as shown in the drawings, in two sections, one part formed of the part of the crank-case adjacent the cylinder from which the passage leads off, and the opposite part formed from the side of the cylinder to which said passage leads, and into which it conveys the charge, I effect also the result of shortening the length of said passage, with consequent increased efficiency, decreased size and weight of the engine, besides the further effect stated, that it permits the interior machining and polishing of the passage. It has been customary in engines of this class, to secure pipes of more or less length to each cylinder, and if these are quite long, it means not only a larger engine but also loss of pressure in conduction of the charge from one cylinder to the other. In addition, my short tapered passage, terminating in inlet ports, practically occupies almost no space, despite that it delivers from the lower end of the cylinder to the medial line of the next adjacent one; besides enabling me to diminish or eliminate friction with the inner walls of the passage by the machining and polishing specified before assembling the engine. The effect of this short tapering passage, wide at the junction with the first cylinder, and narrowed to the inlet ports 10 at its junction with the next adjacent cylinder, is substantially that of an ejector operating directly from the pressure chamber of the first cylinder to the explosion chamber of the next adjacent one.

Mounted upon the outer end 45 of the crank-shaft 83, which end is journaled in bearing 46 formed of and in the shouldered side or housing-framework of the crank-case 23, is a powerful compressor fan 48, fitted with blades 51. This compressor fan is primarily and almost exclusively employed for the compression of air to propel an airplane in which my engine and many duplicates of it, may be installed, or for such other compressor purposes as may be desired. And when flying a high-level plane at sea-level, I do not design to use it for other purpose in the actual operation of the engine itself.

But when an airplane has attained a high altitude, I may direct a portion of the air from this compressor fan, usually not over 10% of its output, to the crank-shaft half-blower fan 8, where it acts as a super-charger by distributing some fraction of its air to the passages 6 and 7 of the engine.

Compression of air by the compressor fan 48 takes place in the expanding passage 52. The portion of compressed air detoured by me for super-charging effects, is directed by the pilot or operator of the engine, by means under his control, not of course shown herein, as they form no part of this invention. When so diverted, certain of this compressed air is passed through the valve 31 and Venturi tube 36, and thus through the engine, as a super-charge, but I do not show details of this, since it does not form part of this patent specification, being the subject of a divisional application for patent, to be filed therefor.

The exhaust passages of the manifold 12 within the crank-case are surrounded by tubes 13, welded to their surface. The exhaust gas leaves the cylinders through the manifold 12 and through nozzle 76 adjacent thereto, to heat and speed the air compressed by the compressor fan 48. In this manner the exhaust energy augments that of the fan 48.

Engine throttle 31 when closed reduces air pressure in inlet passage 36 and less air will flow through the Venturi tube. The inlet for air to the compressor fan 48 is through the centre of guard 59, shown in Figure 3.

The lubrication of the engine is accomplished by pumping oil in the usual or any approved manner down through the centre of the crank-shaft 83, flowing through the bearings and pistons in large quantity to carry off the developed heat. I have shown oil-holes and oil-passages in various parts of the mechanism herein. The oil flowing through the pistons is burned as fuel, and the balance of the circulating oil collects in the aprons 21, where the gas pressure entering into the crank-case forces the oil through tube 87 and through a cooling tube outside the motor-casing, whence it is recirculated through the engine. I do not further particularize the piston lubrication system, as it is not a necessary part of this invention, however needed in operation, and forms the subject of a separate divisional application for patent to be filed therefor.

Nor, for a like reason, do I show and describe the starter mechanism which is mounted in relation to the end of the crank-shaft opposite to the end carrying the compressor fan 48. The magnetos 101, used in connection with starting, are shown mounted within the end bearing casing of the crank-shaft, 102.

Other minor details, not directly a part of my actual invention and devisement, are also omitted, but all these are matters or items well known to those skilled in the art.

In operation, the engine, having been started by any usual means, not shown herein, commences to function by the blower fan revolving, drawing in air and gasoline through the Venturi tube inlet 36, and distributing it as compressed gas into and through the passages 6 and 7, shown in dotted lines in Figure 1, it being understood that these passages lead to the lower portion of the cylinders. Any cylinder of which this under chamber is free to receive the gas, will on the down-stroke of the piston 4, compress that gas and transmit it to the passages 26, under pressure, and through the inlet ports 10 to the explosion chamber of the next adjacent cylinder, where it is compressed on the up-stroke of the piston 4 of said cylinder, and ignited by the spark-plug in the cylinder head.

The engine now being in motion, continuously until the throttle 31 shall have been closed off to shut off the flow of carbureted air or gas completely, the operation may be discerningly followed by reference to the drawings, particularly Figure 1. The fan 8, with its semi-circular arc of blades and semi-circular solid counter-weight section of its disk, alternately forces the gas through the ports 6 to the lower-cylinder ports 7 and into the pressure chamber thereof, and shuts off said ports 6 by the solid section thereof. On the down-stroke of the piston 4, this charge is compressed, and forced into the rear wide end of the passage 26 out through its narrowed ejector-end into the inlet-ports 10 of an adjacent cylinder; and these passages and ports being directed at various degrees of angle, ranging from 68° of the ports furthest from the exhaust ports 11, to 50° for the inlets nearest said exhausts, the charge of gas or carbureted air is not injected into the cylinder in one unified-directional stream, but in a number of varied streams and cross-streams which, as shown clearly in Figure 1, take the separate paths indicated by the arrows, so that each inlet port tends to scavenge a different section of the combustion chamber by a direct curved flow to the said exhaust port without setting up any swirling motion, thus ejecting and squirting it all around and over the cylinder in the explosion chamber thereof, and thereby most efficiently scavenging the cylinder.

It will be noted that, to begin with, the arrangement of my five cylinders radially, with their bases practically touching, establishes that the passages 6 and 7 from the blower-fan 8, and the Venturi tube inlet 36 which feeds that fan, will be quite short in distance to the base of the cylinders. This without intervention of, or dissipation through, any long passage, or any ordinary large volume uniformly wide passage; but instantly after the initial compression of the gas-air in the lower pressure chamber of a cylinder, it is, by this short tapered passage 26, which narrows down to its connection with the inlet-ports 10, forced into the explosion chamber by this extremely short narrowing directive of utterly minimum possible volume. This is an important feature of my invention. Any gas under pressure left in this passage space represents displacement from the compressor piston's cylinder which never reaches the combustion cylinder. It is as bad as clearance volume in an air compressor or steam engine cylinder for volumetric efficiency, but its effect on power output is very much worse since power drops so rapidly with weakening of gas mixture or dilution with exhaust. I not only gain power and speed of the engine by anything that saves waste or loss of power in the passage of the inflowing gases to the explosion chamber, to the pressure chamber, but also by shortening the time of such passage, I accomplish a speeding up of the time of each step in the operation of the engine, vastly increasing the number of R. P. M. thereby, as well as by the other features of my invention so far described in operation.

One of these factors is the scavenging, which of course makes for power directly in itself, in the efficiency of its charge of the cylinder with gas to be exploded, in its scouring fully away the exhaust gases of the last explosion, and in its consequent enabling the lowering of the cylinder head, its shortening of the stroke of the piston thereby, all tending to more revolutions in a given time, more actual power. The exhaust-ports 11 being slightly higher than the inlets 10, they start to exhaust the burnt gases first, then, instantly aferward, the scavenging spray reaches the cylinder, and the cylinder head being low, the scavenge charge enters the cylinder space under good pressure from the tapered passages in a solid unswirling front reaching from top to bottom of the cylinder, and instead of the exhaust mixing with the new charge and slowing operations, it is forced out the ports 11, and there is practically no admixture.

By reason of this compression of the gas by the piston 4 in the lower chamber, and immediate ejection of it as it is being compressed through the short tapered passages immediately into the next cylinder, there is so much time saved, in addition to the efficiency specified, that there is greater rapidity of sequence of the operative steps of the engine.

In addition to the initial air supercharge taken from the output of the main propulsion fan, there are three other gas compressions in the cycle of this engine—first by means of the crankshaft half-sector fan 8 blowing air and fuel into passages 6 and 7 and cylinder space below the pistons, then by the down stroke of the piston compressing and displacing the charge beneath said pistons and forcing all of it at slightly increased pressure into an adjoining cylinder above a piston against an exhaust pressure brought about by restricting the exhaust manifold outlet, and finally the compression caused by the up stroke of a piston compressing the charge in the combustion chamber. Most engines have only the last of these 4 compression stages. Tho some much larger engines have supercharger fans, no operative engines have the other two forms of compression.

It is to be noted further that as soon as a piston has moved far enough under the force of an explosion to expose part of exhaust port 11 the cylinder pressure drops rapidly before the inlet ports begin to be uncovered so that by the time the latter do start to open the pressure in the cylinder has dropped to about the compression reached beneath an adjoining piston supplying the new charge after its 53 degrees of stroke travel.

There is therefor no tendency for the exhaust to blow into the new charge nor need to clutter the passage with obstructing backfire screens. The 12 deg. earlier opening of exhaust ports suffices to equalize pressures. As the stroke proceeds the exhaust pressure drops and inlet pressure increases until the rapid flow thru the inlet ports (which in small cylinders are larger per cu. in. displacement) drops the inlet pressure to only a little more than the exhaust pressure, the flow continuing with constant intensity all the time the ports are open and maximum velocity when widest open.

The attainment of high R. P. M. in this motor of one ninth the usual stroke, and attainment of high power for pound of weight may be better understood by the following description of engine operation. In the left lower cylinder 1, the piston is starting on its downward stroke. The fresh charge, which up to now has been blowing in from beneath under blower-fan pressure through the passages 6 and ports 7, has filled this space, and the fan blades occupying half the circumference of the fan-disk have passed the opening of the passage 6, whereupon the solid portion of the fan-disk has thus closed off this passage. As the piston descends, the charge is compressed between the piston and its apron 21, and in the passage 26 leading to cylinder 2 which at the moment is closed by the piston in that cylinder.

The stroke in cylinder 2, as indicated in Figure 1, has progressed 108°, and with additional crank movement of 17°, flow of gas through the inlet-ports 10 of cylinder 2 is permitted, and this gas will flow in from beneath the piston of cylinder as described above. The gases in the lower scavenging chamber of cylinder 2, beneath its piston, are seen by arrows to be flowing rapidly into the combustion chamber of cylinder 3, having commenced when the piston of that cylinder 3 was about 55° before bottom dead centre, and when the piston in cylinder 2 had advanced 53° from top dead centre or 127° from bottom centre.

As the inlet ports stay open twice 55°, or 110°, the flow from beneath the next adjacent piston stops at 163° of stroke, or 17° from bottom centre, after almost complete travel of the piston. If the stroke is 11/16 inch, and the connecting-rod 2.05 inches long, the scavenge flow from under a piston starts after the piston has moved down .155 inch or 22.9% of stroke, and stops when .0096 inch from bottom of stroke, or after all but 1.4% stroke. During the first 53° or 22.9% of down stroke the piston moves comparatively slowly. The greater part of this time the fan 8 is still blowing air under the piston to fill the pressure chamber between it and the apron 21, and compress the charge under the piston, and in the passage 26 to the next cylinder. After the fan-blades pass the port and said port is closed by the counterweight sector of the fan-disk, further compression takes place under the piston for a few rapidly-passed hundredths of an inch down stroke. By this time the piston speed is becoming very high, so that 75.7% of the down-stroke is then completed in 61% of the down-stroke-time, and after the charge has been given an initial compression so that it may move through the cylinder ports more rapidly.

The compression which took place in the cylinder during the first 22.9% of stroke sufficed only to raise the pressure sufficiently to equal the pressure in the next adjacent cylinder at time of opening of the inlet ports. The exhaust ports 11 in that cylinder had opened about 12° earlier, but during that 12° there had been time only to discharge about half the exhaust products, so that after opening of the inlet ports, a short period of time necessarily elapses before any flow in either direction through these ports takes place. Expectedly the exhaust would tend to first flow back through the inlet ports and burn some of the fresh gas in this nozzle, but in this engine the pressure has been built up high enough to prevent such back-flow, and there exists but a fraction of a second before the rapidly increasing scavenge pressure and concomitantly decreasing cylinder pressure set up a very high velocity flow into the cylinder, one so rapid that there is no danger of any of the gases burning as they rush into the cylinder and force out the burnt gases into the exhaust manifold. Since a short period of time is required to overcome the inertia of the flow, the inlet ports are wide open by the time the flow at this point is affected by the maximum-velocity movement of the piston in the adjoining cylinder. This permits scavenge with minimum power consumption, especially as my two-part passage 26 made up of part of the cylinder-wall and part of the crank-case, enables me to machine and polish it beforehand, as hereinabove stated, there being thus in the finished nozzle no rough walls to obstruct the flow. This passage is deepest where it leaves the bottom of the wall of the scavenging cylinder, and continually decreases in depth until it ends inside the combustion chamber of the adjacent cylinder. This connecting passage is very short and of very small volume and the gas gains a very high velocity between its smooth converging walls with a minimum pressure drop. The cylinders being small, both the exhaust and inlet ports are accordingly large in area proportional to the volume of the cylinders and so permit greater piston speeds with less pressure drop thru these ports than is possible with large cylinders or with poppet type valves.

While I am aware of the prior art of other radial engines I believe there have been none in which a piston moves a complete charge to an adjacent piston on the same crank arm while said second piston remained at approximately the bottom of its stroke. The nearest approach to this has been an attempt to impose less than ¼ a full charge into a cylinder, scavenged with exhaust gas and left full of that exhaust gas, after the usual low ports had been closed and while compression in that cylinder was nearly half completed on its firing cycle. Others have attempted with huge massive step pistons operating on a different crank arm thru seven distinct bearing losses to scavenge as I have done with fly weight pistons and no bearing losses, and even though their pistons have been hundreds of times heavier than mine these were arranged in sets of four or six so that they could not be balanced like my 5 cylinder motor whose cycle of operations is the only one correctly timed. No other engine has fuel passages located in its red hot exhaust manifold so that for ten second intervals large quantities of fuel may be vaporized and superheated under pressure in those red hot passages and burned in the great quantities of air compressed by the very high speed compressor fan absorbing the power of this motor. No other type of engine has the correct speed to give the fan air pressure best adapted for airplane propulsion—a jet velocity just below the speed of sound—none so small and efficient can direct drive a two pole 400 cycle alternator nor does any oil the cylinder walls where and when the pistons are developing thrust thereon. No other engine throttles the outlet of its exhaust manifold to accomplish either of the attainments I gain from, aspiration to take and compress air used for cooling fins and deliver that heated air into the compressed air while also supercharging the engine and further energizing said compressed air for jet propulsion.

In employing the engine for the propulsion of airplanes, or for other purposes in which the compressor-fan 48 is used, there is of course the additional feature of operation of my engine to which I have referred in the description of that feature; namely, that when an unusually high speed of the engine is required, especially in a plane at high altitudes, a portion of the air compressed by the said fan 48 is diverted to supercharger purposes to increase the power of my engine. This portion of the operation will, I am sure, be obvious from the previous description of the device. By means of this auxiliary expedient, my engine reaches of course a newer high point of power and efficiency. The exact mechanism of my adaptation of this portion of my invention, is the subject-matter of a divisional application covering the whole feature, which is to be filed.

Generically, my invention and its principles, are independent of the particular details of various of the parts thereof which I have described herein, and I do not restrict myself to any such details, nor to each separate part or feature of my invention, which I may vary in many ways without departing from the spirit of the same; yet in the specific construction I have shown and described herein, there is set forth the best embodiment of my said invention, possessing many advantages in combining toward the purposed object of producing a reduction of size, weight, and parts, shortening of stroke, distance between actions and parts acting, diminishing the time between steps, and increasing the general rapidity of every element of action, the ultimate speed and power of the engine.

Having thus fully described my invention, what I claim as new and of my own invention, is:

1. An internal combustion engine provided with a plurality of cylinders each having an apron fixed in its lower portion, a piston mounted therein and descending upon the same, to compress the gas, means for admitting gas between said apron and piston, a half sector blower fan distributing said gas to each cylinder at its lower portion, including in its structure means for alternately delivering and preventing return flow of said gas, and inlets leading from said lower portion of each cylinder to the combustion chamber of the next cylinder to deliver the fresh gas thereto.

2. An internal combustion engine provided with a plurality of radially disposed adjacent cylinders each having a direct gas inlet passage to its lower portion beneath the piston, and a series of gas inlets and exhaust ports circumferentially disposed in its combustion chamber, a blower fan formed with a semi-circular series of fan blades to supply gas to the gas inlet passages below the piston, and a semi-circular solid disk portion to cut off said supply passage, and a piston in each cylinder arranged to expose or cut off the circumferentially disposed gas-inlets and gas-exhausts of the combustion chamber, whereby the gas inlets will admit fresh gas to simultaneously charge the combustion chamber and scavenge it of burnt gases downwardly out of said exhaust ports.

3. An internal combustion engine provided with a plurality of radially disposed cylinders in approximate contact at their lower or inner ends, each having a single piston of substantially uniform outside diameter, a combustion chamber above the piston and a compression chamber below the piston, both chambers being of equal diameter, inlet ports to the compression chambers to introduce fresh carbureted gas for compression, means for introducing an entire scavenging and combustion charge into said compression chamber, exhaust ports uncovered by the piston, a passage from the lower end of the compression chamber beneath said piston to the combustion chamber of the next adjacent previously fired contacting cylinder of the same crank throw group of cylinders leading into inlet ports of said combustion chamber, whereby an entire combustion charge is compressed slightly initially and then transferred by the down stroke of the piston under the direct impulsion of the explosion of the charge in said combustion chamber above the said piston.

4. In an internal combustion engine comprising a group or groups of five radially disposed cylinders and each cylinder having exhaust ports and inlet ports and a piston uncovering said ports and a combustion chamber above said piston and a compression chamber below the same, and means whereby the piston on its inward travel under the impulse of an explosion above it compresses a combustion charge for approximately 53 degrees of travel and then transfers said charge during the following 110 degrees of travel or whatever time the inlet ports of the next adjoining cylinder remain open and then compress the remaining gases for the approximate last 17 degrees of stroke below said piston.

5. A structure as set forth in claim 3 wherein the compression and combustion chambers are connected by short tapered passages, of less length than the diameter of said combustion chamber.

6. A structure as set forth in claim 3 wherein the communicating passages between compression chamber and combustion chamber deliver into the latter thru a plurality of circumferentially spaced ports each making a different angle with the medial line of the cylinder, in such arrangement that each port scavenges a distinct and different portion of said cylinder.

7. A structure as set forth in claim 3 wherein the compression and combustion chambers are connected by short tapered passages parts of said passages lying in an approximately straight line from the departure point in compression chamber to a combustion chamber.

8. A structure as set forth in claim 3 wherein the combustion and compression chambers are connected by short passages of small volume, the volume of said passage plus the clearance volume of said compression cylinder being less than half the displacement of said compression cylinder.

DOUGLAS K. WARNER.